(No Model.)

N. P. PERRIN.
PLOW.

No. 465,068. Patented Dec. 15, 1891.

Witnesses
Jas. K. McCathman
D. P. Nothampton

Inventor
N. P. Perrin
By his Attorneys,
C. A. Snow & Co.

United States Patent Office.

NAPOLEON P. PERRIN, OF CANY FORK, ARKANSAS.

PLOW.

SPECIFICATION forming part of Letters Patent No. 465,068, dated December 15, 1891.

Application filed July 31, 1890. Serial No. 360,591. (No model.)

*To all whom it may concern:*

Be it known that I, NAPOLEON P. PERRIN, a citizen of the United States, residing at Cany Fork, in the county of Pike and State of Arkansas, have invented certain new and useful Improvements in Cutting-Colter Attachments for Plows, of which the following is a description.

My invention relates to colters for plows; and it has for its object to provide a cutting-colter that is designed to be used in connection with the sweep of an ordinary plow, and is especially adapted to be used in breaking up new ground, when the roots are troublesome, and other ground ordinarily difficult to break.

With these and other objects in view, which will readily appear as the nature of the invention is fully understood, the invention consists of a colter secured to the sweep and standard of a plow and constructed and arranged in the novel manner hereinafter fully described, illustrated, and claimed.

Figure 1:
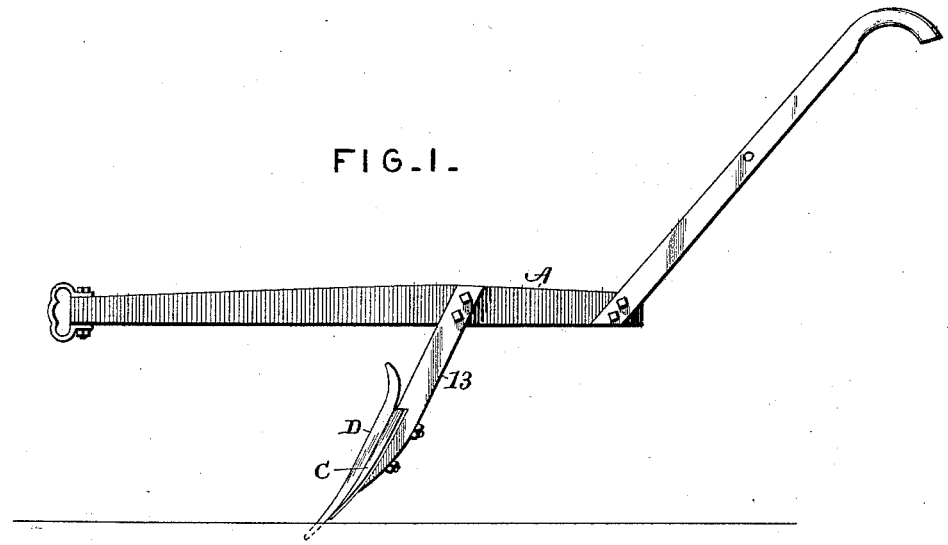
Figure 2:
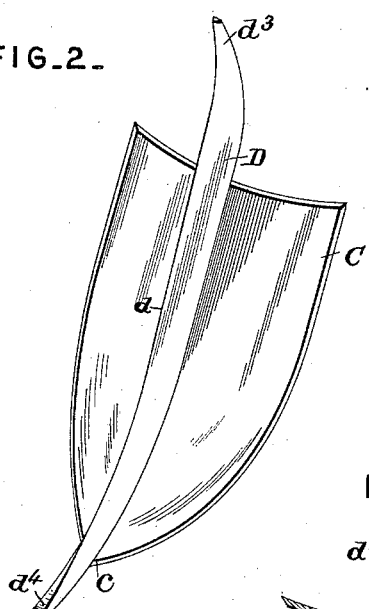
Figure 3:
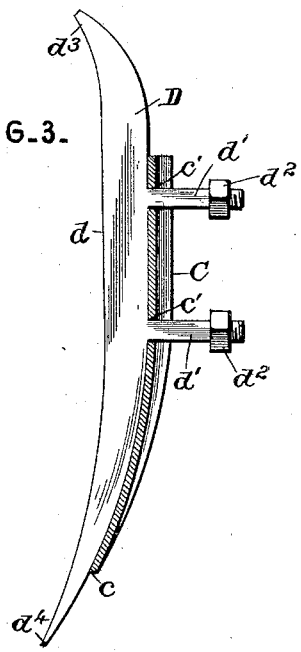
Figure 4:
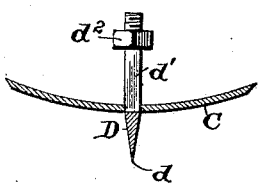

In the accompanying drawings, Figure 1 is a side elevation of a plow provided with a colter and sweep constructed in accordance with my invention. Fig. 2 is a detail in perspective of the sweep and colter detached from the plow. Fig. 3 is a longitudinal section of the same. Fig. 4 is a transverse section of the same.

Referring to the accompanying drawings, A represents the beam of an ordinary plow, to which is secured the ordinary standard B, depending therefrom and carrying at it lower end the shovel or sweep C, secured thereto in the manner to be described. The shovel or sweep C is of the ordinary construction, having an enlarged upper end and tapering to a point $c$, the same being further provided with the perforations or openings $c'$, receiving the bolts which secure it to said standard. The cutting-colter D is designed to be secured to the shovel or sweep and to be centrally and longitudinally located thereon. Said colter is triangular in cross-section and presents the apex $d$ thereof as the cutting-edge, which tears through the obstructions to the sweep and is provided with the integral and rearwardly-extending bolts $d'$, adapted to pass through the openings $c'$ of the sweep C and be secured to the standard by means of the nuts $d^2$, engaging said bolts on the opposite side of said standard. The colter D is extended above and curved out from the broad top of said sweep, as at $d^3$, to present a greater cutting-edge, and is also extended below the point $c$ of the sweep and terminates in a flattened pointed end $d^4$, that travels in the ground in advance of the shovel or sweep, and thus renders the breaking of the soil and the removal of roots, &c., more easily accomplished than by the use of the ordinary plows and colters.

The construction and advantages of my improved colter are thought to be apparent without further description.

Having thus described my invention, what I claim, and desire to secure by Letters Patent, is—

In a plow, the combination, with the standard, of the shovel or sweep having the central perforations or openings and the elongated triangular-shaped colter extended above and curved beyond the upper end of the sweep and extended below the point of the same and terminating in a flattened pointed end traveling in advance of the point of the sweep and provided with the integral rearwardly-extending bolts adapted to pass through the openings of said sweep and secure the same to the plow-standard, substantially as set forth.

NAPOLEON P. PERRIN.

Witnesses:
 LEE GILES,
 W. F. COVINGTON.